(12) United States Patent
Kober et al.

(10) Patent No.: US 8,435,585 B2
(45) Date of Patent: May 7, 2013

(54) PROCESS FOR REDUCING THE MICROBIAL COUNT IN A CHOCOLATE MASS

(75) Inventors: Karl Kober, Ilztal (AT); Herbert Muhr, Ilztal (AT)

(73) Assignee: Agrana Beteiligungs-Aktiengesellschaft, Vienna (AT)

( * ) Notice: Subject to any disclaimer, the term of this patent is extended or adjusted under 35 U.S.C. 154(b) by 461 days.

(21) Appl. No.: 12/517,496

(22) PCT Filed: Dec. 10, 2007

(86) PCT No.: PCT/AT2007/000558
§ 371 (c)(1),
(2), (4) Date: Jul. 22, 2009

(87) PCT Pub. No.: WO2008/070888
PCT Pub. Date: Jun. 19, 2008

(65) Prior Publication Data
US 2010/0068365 A1 Mar. 18, 2010

(30) Foreign Application Priority Data
Dec. 13, 2006 (AT) .................................. 2059/2006

(51) Int. Cl.
*A23L 3/015* (2006.01)
(52) U.S. Cl.
USPC ....................................................... 426/521

(58) Field of Classification Search .......... 426/520–521, 426/468, 312, 660, 631; 422/295, 33; *A23L 3/015*
See application file for complete search history.

(56) References Cited

U.S. PATENT DOCUMENTS

| | | | | |
|---|---|---|---|---|
| 2,147,184 A | * | 2/1939 | Aasted | 426/475 |
| 2,401,077 A | * | 5/1946 | Johnston | 426/511 |
| 3,671,273 A | * | 6/1972 | Gunter | 99/275 |
| 6,017,572 A | | 1/2000 | Meyer | |
| 6,177,115 B1 | * | 1/2001 | Meyer | 426/521 |
| 2002/0197387 A1 | * | 12/2002 | Tilz et al. | 426/660 |

FOREIGN PATENT DOCUMENTS

| | | |
|---|---|---|
| DE | 2513563 | 10/1975 |
| DE | 3111352 | 10/1997 |
| DE | 19612957 | 10/1997 |
| EP | 0974275 | 1/2000 |

* cited by examiner

*Primary Examiner* — Steven Leff
(74) *Attorney, Agent, or Firm* — Lowe Hauptman Ham & Berner, LLP

(57) ABSTRACT

The invention relates to a process for reducing the microbial count in a chocolate mass. A chocolate mass and water are placed in a sterilizable container. The chocolate mass and the water are heated and stirred to a target temperature of more than 100° C. An overpressure in the container is built at least during part of the heating period. The container is degassed and cooled. Upon reaching the target temperature, but prior to step d), the pressure is partially lowered abruptly so that an overpressure remains in the container and subsequently the pressure is raised back to the original overpressure.

14 Claims, No Drawings

PROCESS FOR REDUCING THE MICROBIAL COUNT IN A CHOCOLATE MASS

CROSS-REFERENCE TO RELATED APPLICATIONS

The present Application is based on International Application No. PCT/AT07/000558, filed on Dec. 10, 2007, which in turn corresponds to Austria Application No. A2059/2006, filed on Dec. 13, 2006, and priority is hereby claimed under 35 USC §119 based on these applications. Each of these applications are hereby incorporated by reference in their entirety into the present application.

FIELD OF THE INVENTION

The invention relates to a process for reducing the microbial count in a chocolate mass.

BACKGROUND OF THE INVENTION

From DE-A1 2 513 563, a process for removing harmful flavours, fetid substances and the like from cacao or cacao butter masses is known, according to which additional water is added to the cacao mass and the mass is treated in a thin layer, whereupon excess water as well as the harmful flavours or fetid substances are degassed.

DE-A1 31 111 352 describes a process for the mechanical/thermal treatment of fluid masses, in particular cacao masses, according to which the mass is treated in a retaining reactor under pressure, while water supply to the cacao mass may also occur.

From EP 0 974 275 B1, a process for sterilizing food solid at room temperature comprising the following processing steps is known:
a) The food is heated to a temperature $T_1$ above its melting temperature $T_s$.
b) During a heating period, water vapour is introduced into the liquid food in an ultra-finely dispersed form and said food is heated to a temperature $T_2$, whereby microorganisms contained in the food and permanent forms (spores) thereof are killed.
c) At least during part of the heating period, the food is put under a pressure $p_1$ which is increased in comparison to the atmospheric pressure.
d) The water content in the food is reduced back to a value of less than 5% by weight.

According to EP 0 974 275, the introduction of water vapour into the liquid food from outside is performed using a nozzle attached underneath a rotating dissolver disk.

However, this requires additional expenditures with regard to the equipment.

SUMMARY OF THE INVENTION

It is the object of the present invention to provide a process by means of which the microbial count in a chocolate mass can be lowered without additional expenditures with regard to the equipment.

One aspect of the invention is achieved by a process for reducing the microbial count in a chocolate mass. A chocolate mass and water are placed in a sterilizable container. The chocolate mass and the water are heated and stirred to a target temperature of more than 100° C. An overpressure in the container is built at least during part of the heating period. The container is degassed and cooled. Upon reaching the target temperature, but prior to step d), the pressure is partially lowered abruptly so that an overpressure remains in the container and subsequently the pressure is raised back to the original overpressure.

In another aspect of the invention steps e) and f) are carried out successively several times.

In another aspect of the invention steps e) and f) are repeated four to five times.

In another aspect of the invention in step a), the chocolate mass in provided in liquid form.

In another aspect of the invention, in step b), upon reaching a temperate of 80° C., water vapour is supplied to the headspace of the container in a manner known per se.

In another aspect of the invention the target temperature ranges from 105 to 130° C.

In another aspect of the invention, in step c), an overpressure from 1.5 bar to 2.0 bar is built up in comparison to the ambient pressure.

In another aspect of the invention, in step e), the pressured is lowered by 0.5 bar.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

DETAILED DESCRIPTION OF THE INVENTION

The process according to the invention for reducing the microbial count in a chocolate mass is preferably carried out as follows:

A chocolate mass (temperature approx. 50° C.) supplied already in liquid form is placed in a cylindrical container comprising a stirrer as commonly used for the treatment of chocolate masses. Approx. 4% of water (based on the chocolate mass) is added at a temperature of likewise approx. 40-50° C.

The container is closed and the mixture is heated to a target temperature of approx. 105° C. to 110° C. under continuous stirring.

The headspace of the container is steamed in a known fashion upon reaching a temperature of 80° C. or more. The steam inlet is located approx. 80 cm above the chocolate/water mixture and is flush with the container dome. No water vapour is thereby introduced into the chocolate mass.

While the mixture is heated, an overpressure of approx. 1.5 to 2.0 bar is built up in the container.

Upon reaching the target temperature, the pressure in the container is abruptly relieved by approx. 0.5 bar and subsequently raised back to the original overpressure. Preferably, the duration of both pressure relief and renewed pressurization is a matter of seconds.

The pressure relief leads to a spontaneous formation of water vapour and a uniform penetration of the latter in the chocolate mass. Depending on the type of chocolate mass, this operation is carried out once or is repeated up to four or five times.

Subsequently, the mixture is cooled down to approx. 55° C., and residual water is withdrawn by applying a vacuum.

Partially—in particular repeatedly—lowering the pressure in the container and raising it back to the original overpressure results in an additional reduction in the microbial count in a chocolate mass without necessitating additional equipment facilities in that regard.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A process for reducing the microbial count in a chocolate mass, comprising the steps of:
   a) adding and amount of liquid water and a chocolate mass having a microbial count to a sterilizable container and thereafter closing the container; and thereafter
   b) heating the chocolate mass and the liquid water and stirring to a target temperature of more than 100° C.;
   c) building up an overpressure above the liquid water in the container at least during part of the heating period;
   d) degassing and cooling the container;
   e) upon reaching the target temperature, but prior to step d), partially lowering the pressure so that an overpressure remains in the container and the lowering of pressure forms water vapour from the liquid water and the formed water vapour penetrates the chocolate mass thereby reducing the microbial count in the chocolate mass; and subsequently
   f) raising back the pressure to the original overpressure.

2. The process according to claim 1, wherein steps e) and f) are carried out successively several times.

3. The process according to claim 2, wherein steps e) and f) are repeated four to five times.

4. The process according to claim 2, wherein, in step a), the chocolate mass is provided in liquid form.

5. The process according to claim 1, wherein, in step a), the chocolate mass is provided in liquid form.

6. The process according to claim 1, further comprising, in step b), upon reaching a temperature of 80° C., supplying steam to a headspace of the container.

7. The process according to claim 1, wherein the target temperature ranges from 105° C. to 130° C.

8. The process according to claim 1, wherein, in step c), an overpressure from 1.5 bar to 2.0 bar is built up in comparison to the ambient pressure.

9. The process according to claim 1, wherein, in step e), the pressure is lowered by 0.5 bar.

10. The process according to claim 1, wherein the amount of liquid water in step a) is approximately 4% based on weight of the chocolate mass.

11. The process according to claim 1, wherein the amount of liquid water in step a) is sufficient to generate, in step e), water vapour that uniformly penetrates the chocolate mass.

12. A process for reducing the microbial count in a chocolate mass, comprising the steps of:
   a) adding an amount of liquid water and a chocolate mass having a microbial count to a sterilizable container and thereafter closing the container; and thereafter
   b) heating the chocolate mass and the liquid water and stirring to a target temperature of more than 100° C.;
   c) building up an overpressure above the liquid water ranging from 1.5 to 2.0 bar in the container at least during part of the heating period;
   d) degassing and cooling the container;
   e) upon reaching the target temperature, but prior to step d), partially lowering the pressure so that an overpressure remains in the container and the lowering of pressure forms water vapour from the liquid water and the formed water vapour penetrates the chocolate mass thereby reducing the microbial count in the chocolate mass; and subsequently
   f) raising back the pressure to the original overpressure.

13. The process according to claim 12, wherein the amount of liquid water in step a) is approximately 4% based on weight of the chocolate mass.

14. The process according to claim 12, wherein the amount of liquid water in step a) is sufficient to generate, in step e), water vapour that uniformly penetrates the chocolate mass.

* * * * *